(12) United States Patent
Wang et al.

(10) Patent No.: US 10,311,263 B2
(45) Date of Patent: Jun. 4, 2019

(54) AUTOMATIC VENDING MACHINE

(71) Applicant: Husky Refrigerators Mfg Co., Ltd., Foshan, Guangdong (CN)

(72) Inventors: Wei Wang, Guangdong (CN); Yaxue Liu, Guangdong (CN)

(73) Assignee: Husky Refrigerators Mfg Co., Ltd., Foshan (CN)

( * ) Notice: Subject to any disclaimer, the term of this patent is extended or adjusted under 35 U.S.C. 154(b) by 0 days.

(21) Appl. No.: 15/867,651

(22) Filed: Jan. 10, 2018

(65) Prior Publication Data

US 2019/0114453 A1    Apr. 18, 2019

(30) Foreign Application Priority Data

Oct. 16, 2017   (CN) .................... 2017 2 1338251 U

(51) Int. Cl.
| | | |
|---|---|---|
| *G06F 19/00* | (2018.01) | |
| *G06K 7/10* | (2006.01) | |
| *G09F 7/18* | (2006.01) | |
| *G06K 7/14* | (2006.01) | |

(52) U.S. Cl.
CPC ....... *G06K 7/10316* (2013.01); *G06K 7/1417* (2013.01); *G09F 7/18* (2013.01)

(58) Field of Classification Search
CPC .. G06Q 10/087; G06Q 10/0833; G06Q 20/10; G06Q 20/18; G06Q 20/342; G07F 17/0014; G07F 19/203; G07G 1/0045; G07G 1/009; G16H 20/13
USPC ........................................................ 235/385
See application file for complete search history.

(56) References Cited

U.S. PATENT DOCUMENTS

| | | | | |
|---|---|---|---|---|
| 9,120,622 | B1 * | 9/2015 | Elazary ..................... | B66F 9/07 |
| 2004/0103033 | A1 * | 5/2004 | Reade .................... | G06Q 20/20 |
| | | | | 705/16 |
| 2014/0081874 | A1 * | 3/2014 | Lewis ................... | G07F 19/205 |
| | | | | 705/72 |
| 2014/0251986 | A1 * | 9/2014 | Jacobsen ................ | H05B 6/647 |
| | | | | 219/756 |
| 2014/0361076 | A1 * | 12/2014 | Iantorno ............. | G06F 19/3462 |
| | | | | 235/381 |
| 2016/0012465 | A1 * | 1/2016 | Sharp ..................... | G06Q 20/18 |
| | | | | 705/14.17 |
| 2016/0295906 | A1 * | 10/2016 | Jacobsen ................ | A23N 12/10 |
| 2016/0307013 | A1 * | 10/2016 | Dagdelen Uysal ......................... | |
| | | | | G06K 7/10366 |

\* cited by examiner

*Primary Examiner* — Thien M Le

(57) ABSTRACT

The present invention relates to an automatic vending machine, which includes a smart shelf and a server back-end management system, wherein a door body is arranged on the smart shelf, a main control board is arranged on the smart shelf, the main control board is respectively electrically connected with an electric inserting lock, an antenna array, and an Alipay two-dimensional code input terminal; the main control board is interconnected with the server back-end management system through the Internet, the server back-end management system is accessed to Zhima credit system through the Internet; the door body forms an opening and closing connection with the smart shelf through the electric inserting lock; the main control board and the antenna array are connected through a multi-channel read head controller and a signal amplification motherboard. It is convenient to use.

6 Claims, 6 Drawing Sheets

AUTOMATIC VENDING MACHINE

CROSS-REFERENCE TO RELATED APPLICATIONS

This application claims priority to Chinese Utility Model Application No. 201721338251.6 filed on Oct. 16, 2017, the entire contents of which are hereby incorporated by reference.

TECHNICAL FIELD

The present invention relate to the field of a vending machine, and in particular, to an automatic vending machine.

BACKGROUND

Existing vending machines generally have a transaction system connected to the Internet. Users may achieve trading only after being accessed via a mobile device, but the door of most vending machines cannot be opened so that consumers are free to select goods. The consumers can only select goods through the screen, the user experience is not ideal, the interface operation is complex; even the vending machines with the feature of freely selecting goods have more complicated access means, for example, it can only be identified through fingerprints or other secure access means, and the current Internet credit rating system, namely, Zhima credit system, is not used. The present invention realizes an access by scanning code, consumers may freely select goods, and a credit contrast access and an automatic deduction is realized through the Zhima credit system at the background.

SUMMARY

According to the automatic vending machine of the present invention, it is convenient to use. As long as the user has an Alipay account, an access is realized by scanning code, and a credit score test is performed through the Zhima credit system, the door body of the vending machine may be opened. After the door body is opened, consumers may freely select goods, a system inventory exists and the Alipay automatic deduction is performed. In the entire process, the complex process is run and processed by the background, consumers only need to scan code and select goods, and the entire consumption process is convenient, fast, and high in degree of intelligence.

In order to solve the above technical problem, the present invention adopts a technical scheme that: an automatic vending machine, comprising a smart shelf and a server back-end management system, wherein a door body is arranged on the smart shelf, wherein a main control board is arranged on the smart shelf, the main control board is respectively electrically connected with an electric inserting lock, an antenna array, and an Alipay two-dimensional code input terminal;

the main control board is interconnected with the server back-end management system through the Internet, and the server back-end management system is accessed to Zhima credit system through the Internet;

the door body forms an opening and closing connection with the smart shelf through the electric inserting lock;

the Alipay two-dimensional code input terminal is arranged on the door body or the smart shelf;

the main control board and the antenna array are connected through a multi-channel read head controller and a signal amplification motherboard; and an RFID three-dimensional antenna inventory system is provided on the antenna array.

In the actual shopping scenario of a user, a guideline of the shopping process is posted on the appearance of the vending machine, prompting consumers to scan the Alipay two-dimensional code posted on the appearance of the vending machine through Alipay.

1. When consumers scan the code, the server back-end management system calls the Zhima credit system to verify Alipay account of consumers to determine that when the Zhima credit score of consumers is greater than or equal to 550 points, the server back-end management system issues instructions to the main control board. The main control board controls the opening of the electric inserting lock, allowing consumers to open the door body.

2. When consumers scan the code, the server back-end management system calls the Zhima credit system to verify Alipay account of consumers to determine that when the Zhima credit score of consumers is less than 550 points, the server back-end management system rejects consumers to open the door and send prompts to the mobile device of consumers.

3. When the user is allowed to open the door to buy goods, guarantee is made using the Zhima credit system without deposit. Consumers select goods from the device and complete the closing action.

4. The goods on the smart shelf are checked through the third-party authorized RFID three-dimensional antenna inventory system, and the goods and prices consumed by the user are calculated through a server back-end management system algorithm.

5. The consumption behavior of the user is settled through the Alipay deduction agreement API.

In the entire process, the complex process is run and processed by the background, consumers only need to scan code and select goods, and the entire consumption process is convenient, fast, and high in degree of intelligence; consumers have a good consumption experience.

Preferably, the top of the door body is provided with a lock inserting hole, an electric inserting lock is arranged on the smart shelf above the top of the door body, and a retractable lock pin matching with the lock inserting hole is provided on the electric inserting lock; when the main control board issues an unlocking instruction to the electric inserting lock so that the retractable lock pin is separated from the lock inserting hole, and the door body may be manually opened and closed by consumers; it is convenient in structure and low in cost.

Preferably, the top of the smart shelf is connected with a camera through a bracket forward; the condition of the vending machine is monitored in real time, and the failure is promptly fed back to the after-sales department for follow-up processing if there is any.

Preferably, the main control board is accessed to the Internet via a 4G router.

Preferably, the main control board is connected with a speaker; the speaker has a prompt tone, prompting consumers to operate.

Preferably, the top of the smart shelf is provided with an advertisement display area.

The pre-work of the system is as follows: the deduction agreement is officially signed with Alipay under Ant Financial to obtain the corresponding API, including Alipay "Zhima credit free deposit leasing system" API.

The beneficial effects of the present invention are as follows:

The present invention provides an automatic vending machine which is convenient to use. As long as the user has an Alipay account, an access is realized by scanning code, and a credit score test is performed through the Zhima credit system, the door body of the vending machine may be opened. After the door body is opened, consumers may freely select goods, a system inventory exists and the Alipay automatic deduction is performed. In the entire process, the complex process is run and processed by the background, consumers only need to scan code and select goods, and the entire consumption process is convenient, fast, and high in degree of intelligence.

BRIEF DESCRIPTION OF THE DRAWINGS

One or more embodiments are illustrated by way of example in the figures in the accompanying drawings. These exemplary descriptions do not constitute a limitation on the embodiments, where like reference numerals are used to refer to like elements, unless otherwise stated. The figures in the accompanying drawings do not constitute a scale limitation.

DESCRIPTION OF THE EMBODIMENTS

In order to facilitate understanding of the present invention, the present invention will be described in more detail below with reference to the accompanying drawings and specific embodiments.

Unless otherwise defined, all technical and scientific terms used herein have the same meaning as commonly understood by one of ordinary skill in the art to which the present invention belongs. The terms used in the specification of the present invention are merely for the purpose of describing specific embodiments and are not intended to limit the present invention.

Figure 1:
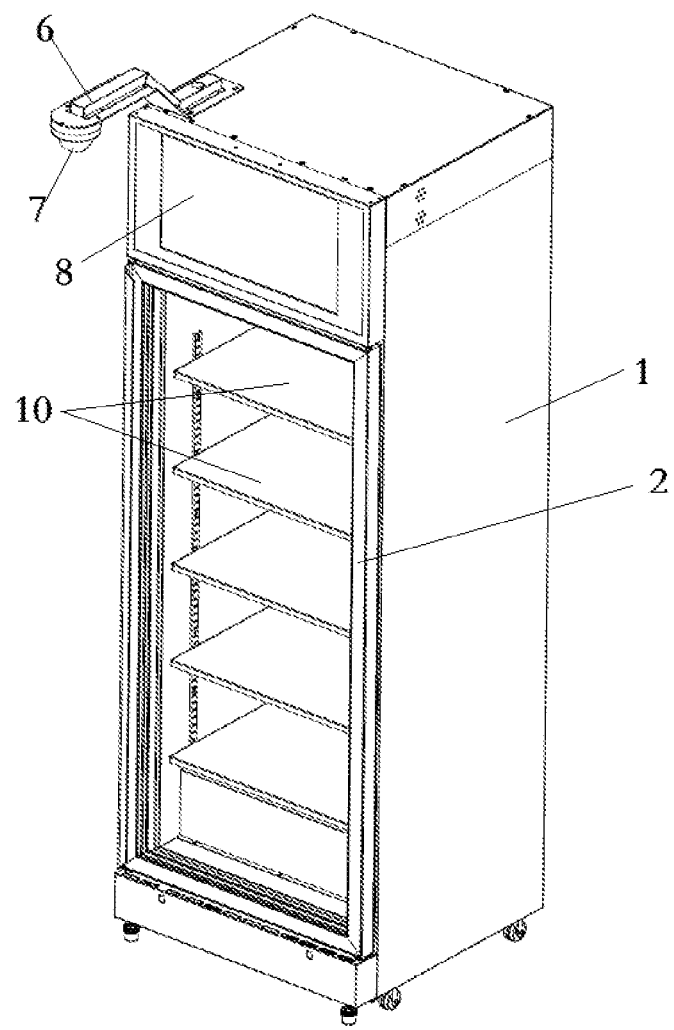
FIG. 1 is a schematic structural view of the present invention.
Figure 2:
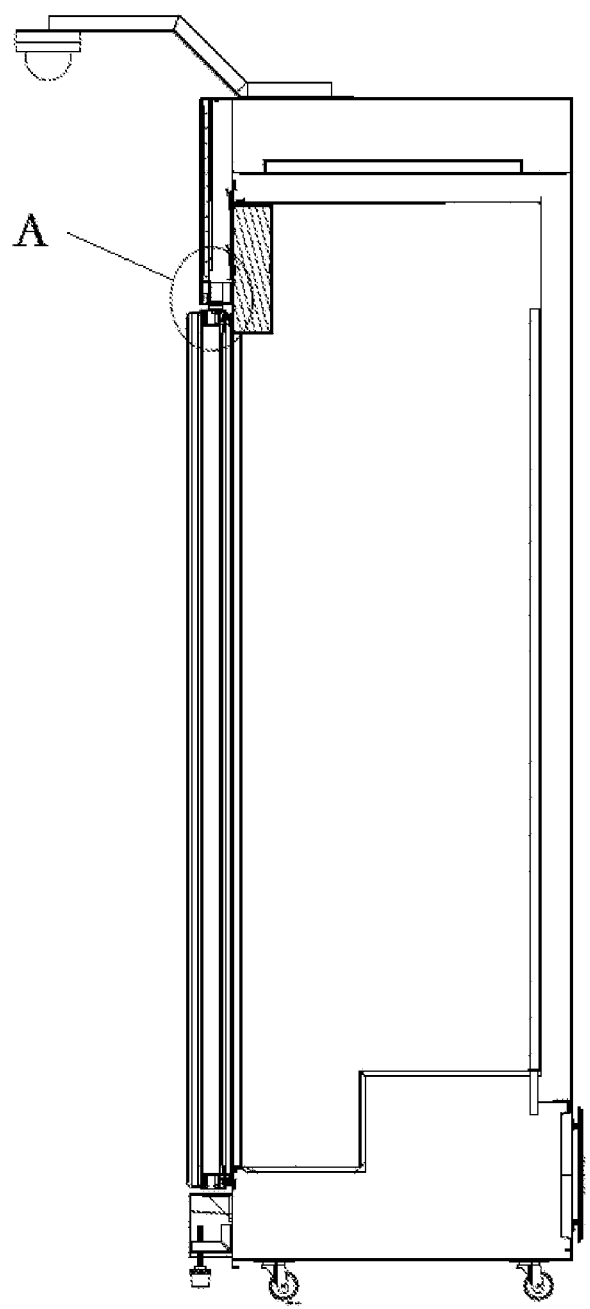
FIG. 2 is a side sectional view of the present invention.
Figure 3:
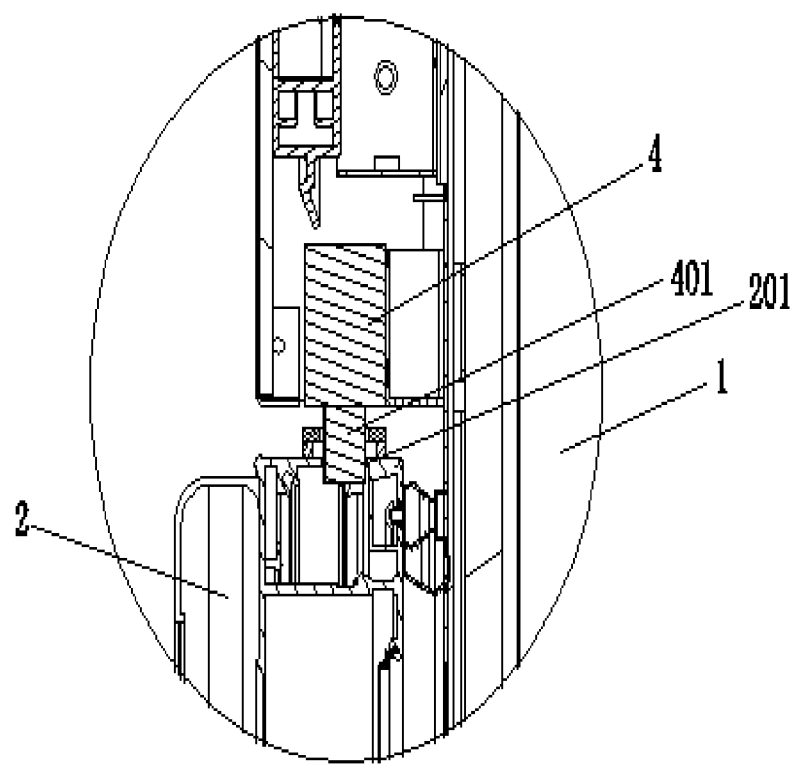
FIG. 3 is an enlarged view taken along line A in FIG. 2.
Figure 4:
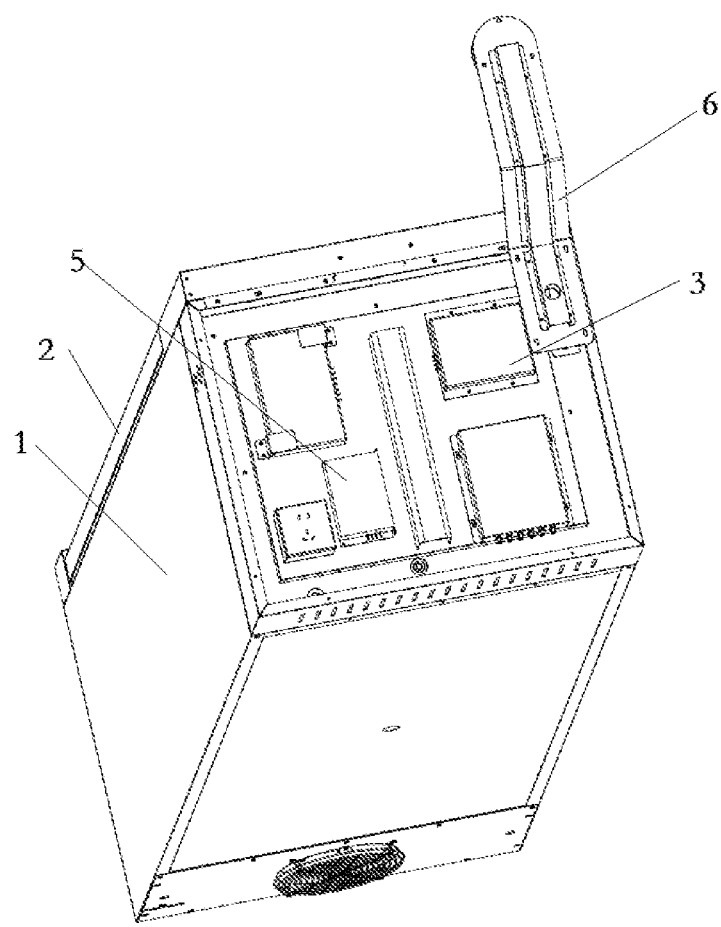
FIG. 4 is a schematic structural view of the present invention.
Figure 5:
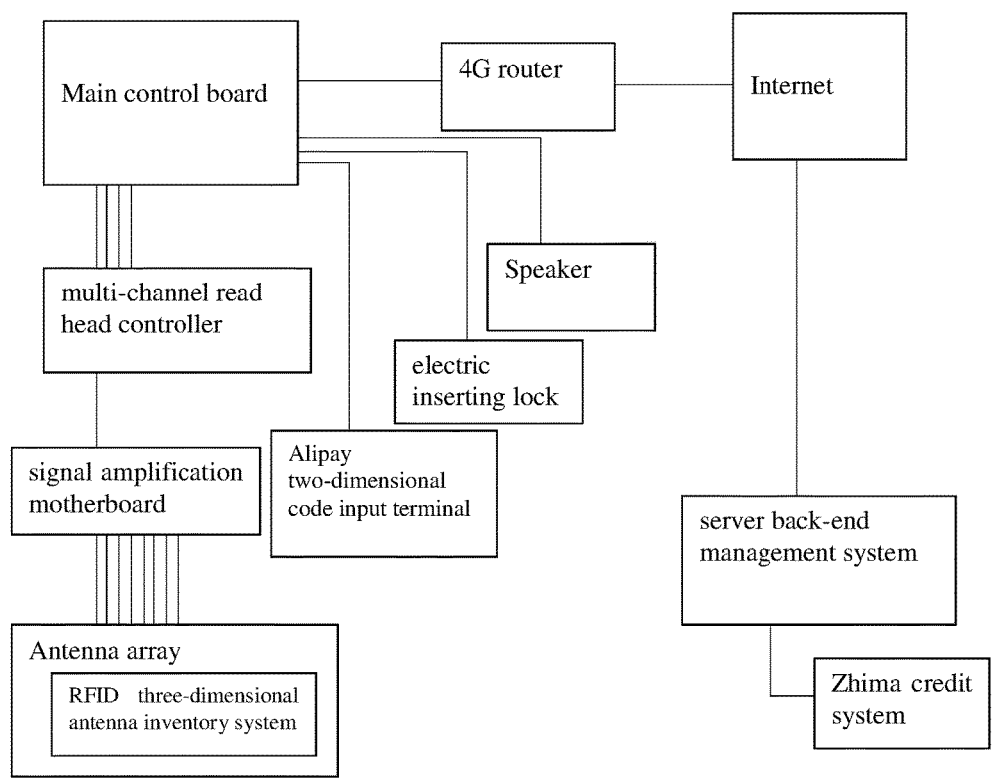
FIG. 5 is a block diagram of the smart system module of the present invention.
Figure 6:
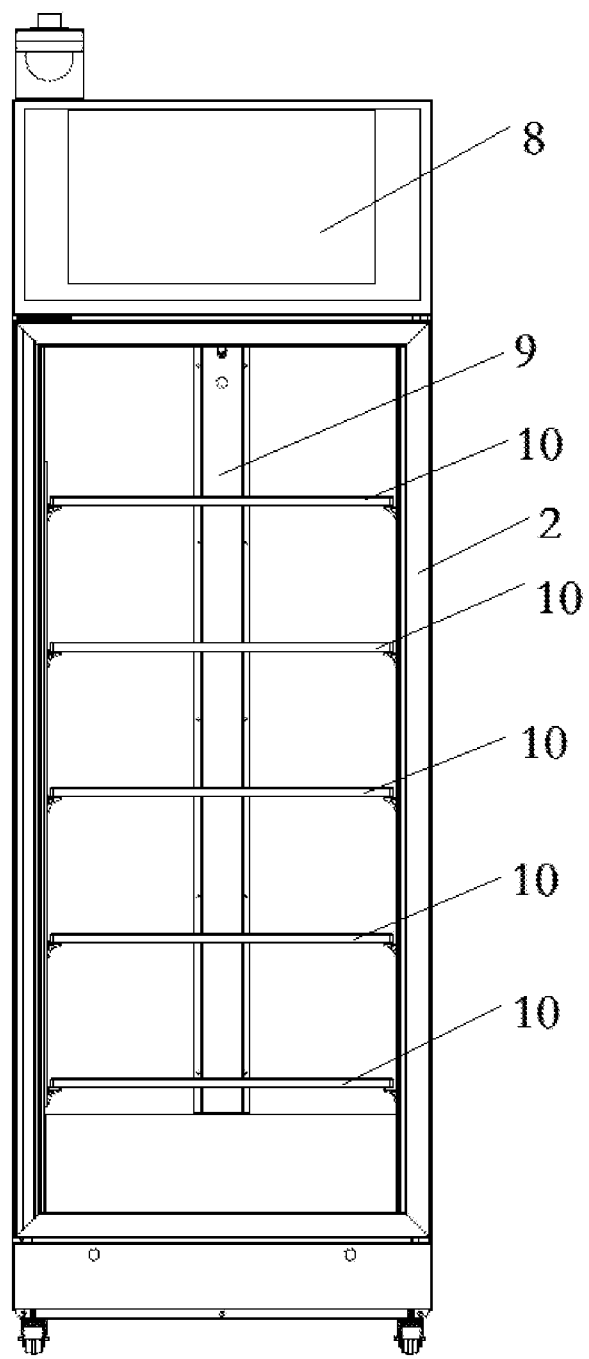
FIG. 6 is a schematic structural view of the present invention.

As shown in FIG. 1 to FIG. 6, an vending machine comprises a smart shelf 1 and a server back-end management system, wherein a door body 2 is arranged on the smart shelf 1, wherein a main control board 3 is arranged on the smart shelf 1, the main control board 3 is respectively electrically connected with an electric inserting lock 4, an antenna array 5, and an Alipay two-dimensional code input terminal 6;

the main control board 3 is interconnected with the server back-end management system through the Internet, and the server back-end management system is accessed to Zhima credit system through the Internet;

the door body 2 forms an opening and closing connection with the smart shelf 1 through the electric inserting lock 4;

the Alipay two-dimensional code input terminal is arranged on the door body 2 or the smart shelf 1;

the main control board 3 and the antenna array 5 are connected through a multi-channel read head controller and a signal amplification motherboard; and an RFID three-dimensional antenna inventory system is provided on the antenna array 5. The RFID three-dimensional antenna inventory system is connected with the smart shelf 1; the RFID three-dimensional antenna inventory system comprises a read/write antenna module 9 provided at the rear end of the smart shelf 1, a plurality of plies 10 (five plies 10 are used in the present embodiment) are arranged within each of the smart shelves 1, two circuit boards (not shown) on each ply 10 are connected to the read/write antenna module 9, the read/write antenna module is connected to each of the smart shelves 1 so as to enable the read/write antenna to scan the goods with a read/write tag (not shown) on the external packing on the ply 10. The read/write antenna module 9 is connected with the main control board 3 via a signal. The goods with a read/write tag may only be scanned and read on the smart shelf 1. Once the door body 2 is opened, the read/write antenna module 9 cannot read and identify the tag information of the goods after the goods is picked up, so the door body 2 must be the door body capable of shielding signals. The number of goods on the smart shelf 1 can be read gain by the read/write antenna module 9 after consumers pick up the goods, and the information can be fed back to the main control board 3 in time and then is fed back to the server back-end management system to carry out Alipay settlement.

In the actual shopping scenario of a user, a guideline of the shopping process is posted on the appearance of the vending machine, prompting consumers to scan the Alipay two-dimensional code posted on the appearance of the vending machine through Alipay.

1. When consumers scan the code, the server back-end management system calls the Zhima credit system to verify Alipay account of consumers to determine that when the Zhima credit score of consumers is greater than or equal to 550 points, the server back-end management system issues instructions to the main control board. The main control board 3 controls the opening of the electric inserting lock 4, allowing consumers to open the door body 2.

2. When consumers scan the code, the server back-end management system calls the Zhima credit system to verify Alipay account of consumers to determine that when the Zhima credit score of consumers is less than 550 points, the server back-end management system rejects consumers to open the door and send prompts to the mobile device of consumers.

3. When the user is allowed to open the door to buy goods, guarantee is made using the Zhima credit system without deposit. Consumers select goods from the device and complete the closing action.

4. The goods on the smart shelf 1 are checked through the third-party authorized RFID three-dimensional antenna inventory system, and the goods and prices consumed by the user are calculated through a server back-end management system algorithm.

5. The consumption behavior of the user is settled through the Alipay deduction agreement API.

In the entire process, the complex process is run and processed by the background, consumers only need to scan code and select goods, and the entire consumption process is convenient, fast, and high in degree of intelligence; consumers have a good consumption experience.

Preferably, the top of the door body 2 is provided with a lock inserting hole 201, an electric inserting lock 4 is arranged on the smart shelf 1 above the top of the door body 2, and a retractable lock pin 401 matching with the lock inserting hole 201 is provided on the electric inserting lock 4; when the main control board 3 issues an unlocking instruction to the electric inserting lock 4 so that the retractable lock pin 401 is separated from the lock inserting hole 201, and the door body 2 may be manually opened and closed by consumers; it is convenient in structure and low in cost.

Preferably, the top of the smart shelf 1 is connected with a camera 7 through a bracket 6; the condition of the vending machine is monitored in real time, and the failure is promptly fed back to the after-sales department for follow-up processing if there is any.

The main control board 3 is accessed to the Internet via a 4G router.

The main control board 3 is connected with a speaker (not shown); the speaker has a prompt tone, prompting consumers to operate.

The top of the smart shelf 1 is provided with an advertisement display area 8; the advertisement display area 8 may be a plane advertisement sticker or an electronic advertiser or other forms of advertisement display devices.

The pre-work of the system is as follows: the deduction agreement is officially signed with Alipay under Ant Financial to obtain the corresponding API, including Alipay "Zhima credit free deposit leasing system" API.

It should be noted that the preferred embodiments of the present invention are given in the specification of the present invention and the accompanying drawings. However, the present invention may be implemented in many different forms and is not limited to the embodiments described in this specification. These embodiments are not to be construed as limiting the scope of the present invention, which are provided so that its understanding of the disclosure will be more thorough and complete. Further, each of the above-mentioned technical features continues to be combined with each other to form various embodiments not listed above and is considered to be within the scope of the description of the present invention. Further, those skilled in the art may make improvements or transformations according to the above description, and all such improvements and transformations shall fall within the protection scope of the appended claims of the present invention.

What is claimed is:

1. An automatic vending machine, comprising a smart shelf and a server back-end management system, wherein a door body is arranged on the smart shelf, a main control board is arranged on the smart shelf, the main control board is respectively electrically connected with an electric inserting lock, an antenna array, and an Alipay two-dimensional code input terminal;

the main control board is interconnected with the server back-end management system through the Internet, and the server back-end management system is accessed to Zhima credit system through the Internet;

the door body forms an opening and closing connection with the smart shelf through the electric inserting lock;

the Alipay two-dimensional code input terminal is arranged on the door body or the smart shelf;

the main control board and the antenna array are connected through a multi-channel read head controller and a signal amplification motherboard; and an RFID three-dimensional antenna inventory system is provided on the antenna array, wherein the RFID three-dimensional antenna inventory system is connected with the smart shelf and further comprises a read/write antenna module connected to the main control board; and a plurality of plies connected to the read/write antenna module.

2. The vending machine according to claim 1, wherein the top of the door body is provided with a lock inserting hole, an electric inserting lock is arranged on the smart shelf above the top of the door body, and a retractable lock pin matching with the lock inserting hole is provided on the electric inserting lock.

3. The vending machine according to claim 1, wherein the top of the smart shelf is connected with a camera through a bracket forward.

4. The vending machine according to claim 1, wherein the main control board is accessed to the Internet via a 4G router.

5. The vending machine according to claim 1, wherein the main control board is connected with a speaker.

6. The vending machine according to claim 1, wherein the top of the smart shelf is provided with an advertisement display area.

* * * * *